(12) United States Patent
Mor et al.

(10) Patent No.: US 9,550,903 B2
(45) Date of Patent: Jan. 24, 2017

(54) METALLIC PIGMENT PARTICLES AND ELECTROSTATIC INKS

(75) Inventors: Ilanit Mor, Kiryat Ono (IL); Albert Teishev, Rishon le-zion (IL); Yaron Grinwald, Meitar (IL); Julia Kornilov, Rehovot (IL); Adi Inbar, Rehovot (IL); Mirit Shitrit, Yavne (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 38 days.

(21) Appl. No.: 14/415,681

(22) PCT Filed: Jul. 20, 2012

(86) PCT No.: PCT/EP2012/064342
§ 371 (c)(1),
(2), (4) Date: Mar. 3, 2015

(87) PCT Pub. No.: WO2014/012597
PCT Pub. Date: Jan. 23, 2014

(65) Prior Publication Data
US 2015/0175826 A1 Jun. 25, 2015

(51) Int. Cl.
| C09D 11/52 | (2014.01) |
| H01B 1/02 | (2006.01) |
| C09C 1/62 | (2006.01) |
| C09C 3/10 | (2006.01) |
| G03G 9/12 | (2006.01) |

(52) U.S. Cl.
CPC ............. *C09D 11/52* (2013.01); *C09C 1/62* (2013.01); *C09C 3/10* (2013.01); *G03G 9/122* (2013.01); *H01B 1/02* (2013.01); *C01P 2004/61* (2013.01); *C01P 2006/40* (2013.01); *C01P 2006/60* (2013.01)

(58) Field of Classification Search
CPC ............ C09D 11/52; C09C 1/62; C09C 3/10; G03G 9/1222; H01B 1/02; C01P 2004/61; C01P 2006/40; C01P 2006/60
USPC ........................................................ 252/500
See application file for complete search history.

(56) References Cited

U.S. PATENT DOCUMENTS

| 5,622,804 | A | 4/1997 | Matsuoka et al. |
| 5,723,250 | A | 3/1998 | Matsuoka et al. |
| 6,458,458 | B1 | 10/2002 | Cooke et al. |
| 6,828,358 | B2 | 12/2004 | Morrison et al. |
| 2011/0008613 | A1* | 1/2011 | Takano ............... C09C 1/62 428/327 |
| 2012/0114378 | A1 | 5/2012 | Golodetz et al. |
| 2012/0116110 | A1 | 5/2012 | Ookubo et al. |

FOREIGN PATENT DOCUMENTS

| CN | 1616561 | 5/2005 |
| CN | 101965384 | 2/2011 |
| EP | 0535971 | 4/1993 |
| EP | 2256169 | 12/2010 |
| WO | WO-2004/090080 | 10/2004 |
| WO | WO-2006/041658 | 4/2006 |
| WO | WO-2007/130069 | 11/2007 |
| WO | WO-2011136997 | 11/2011 |

OTHER PUBLICATIONS

"Dielectric Constants of some common Liquids". The Engineering ToolBox. Total pp. 2. Accessed on Apr. 20, 2016.*
CRC Handbook of Chemistry and Physics, 77th Edition, 1996-1997, Editor: David R. Lide, see part 6, p. 151-184.
EFSA Journal 2010; 8(2): 1520, p. 6.
Fuel Emulsion Composition—Issued Jul. 5, 2012 http://patentscope.wipo.int/search/en/detail.jsf?docid=WO2004090080&recNum=5& . . . .
Oil dispersions of zinc oxide—Issued Jul. 5, 2012 http://patentscope.wipo.int/search/en/detail.jsf?docid=EP12385104&recNum=1&max.

* cited by examiner

*Primary Examiner* — Mark Kopec
*Assistant Examiner* — Danny N Kang
(74) *Attorney, Agent, or Firm* — Dierker & Kavanaugh, P.C.

(57) ABSTRACT

The present disclosure relates to a method for coating conductive metallic pigment particles, the method comprising: providing a first liquid carrier containing a dissolved resin and suspended conductive metallic pigment particles; effecting precipitation of the resin from the first liquid, such that a coating of the resin is formed on the conductive metallic pigment particles. Also disclosed herein are conductive metallic pigment particles, and an electrostatic ink composition comprising coated conductive metallic pigment particles.

17 Claims, No Drawings

METALLIC PIGMENT PARTICLES AND ELECTROSTATIC INKS

Electrostatic printing processes typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate. Variations of this method utilize different ways for forming the electrostatic latent image on a photoreceptor or on a dielectric material.

DETAILED DESCRIPTION

Before examples of the present invention is disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and other additives can be dispersed to form a liquid electrostatic ink or electrophotographic ink. Carrier liquids can include a mixture of a variety of different agents, such as surfactants, co-solvents, viscosity modifiers, and/or other possible ingredients.

As used herein, "electrostatic ink composition" generally refers to an ink composition that is typically suitable for use in an electrostatic printing process, sometimes termed an electrophotographic printing process. It may comprise chargeable particles, which may comprise a thermoplastic resin.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly, or indirectly via an intermediate transfer member, to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 1000 V/cm or more, or in some examples 1500 V/cm or more.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In a first aspect, there is provided a method for coating conductive metallic pigment particles, the method comprising
  providing a first liquid carrier containing a dissolved resin and suspended conductive metallic pigment particles;
  effecting precipitation of the resin from the first liquid, such that a coating of the resin is formed on the conductive metallic pigment particles.

In a second aspect, there is provided a conductive metallic pigment particles having a coating thereon producible in accordance with the method according to the first aspect.

In a third aspect, there is provided an electrostatic ink composition comprising conductive metallic pigment particles according to the second aspect.

Much research has been carried out in recent years to try to create a silver-look electrostatic printing ink. Some electrostatic printing inks have been produced, e.g. by grinding a metallic pigment with a resin, sometimes in the presence of a liquid carrier. However, some of such inks have been found to have an insufficient and inconsistent metallic appearance, have a high level of background when printed, result in a low lifespan of binary ink development units, photoimaging plate and intermediate transfer members, sometimes form streaks on printing, print at relatively high voltages and currents, and/or sometimes display non-electrostatic ink-like behaviour. The present inventors have found that examples of the method as described herein avoid or at least mitigate at least one of the difficulties described above. They have found that examples of the method are more successful in encapsulating conductive pigment particles and that the pigment particles have less of a tendency to deform during the production process.

The conductive metallic pigment, in the present application, indicates an electrically conductive metallic pigment. The conductive metallic pigment comprises a metal. The metal may be a metal in elemental form or an alloy of two or more metals. The conductive metallic pigment may comprise a metal selected from aluminium, tin, a transition metal, and alloys of any one of more thereof. The transition metal may be selected from, for example, zinc, copper, silver, gold, nickel, palladium, platinum, and iron. Alloys that may be used include, but are not limited to, brass, bronze, steel and chromium.

The conductive metallic pigment, in any of the aspects herein, may have any three-dimensional shape. In some examples, the conductive metallic pigment is in the form selected from a flake, a sphere, a rod, or approximations thereof. In the present application, a flake may be a shape with a first dimension, which may be termed a thickness, less than the other two dimensions. In some examples, the flake has a thickness of at least 0.01 µm, in some examples a thickness of at least 0.05 µm, in some examples a thickness of at least 0.05 µm, in some examples a thickness of at least 0.1 µm, in some examples a thickness of at least 0.15 µm, in some examples a thickness of at least 0.18 µm. In some examples, the flake has a thickness of 1 µm or less, in some examples a thickness of 0.8 µm or less, in some examples a thickness of 0.5 µm or less, in some examples a thickness of 0.4 µm or less, in some examples a thickness of 0.3 µm or less.

In some examples, the flake has a diameter, measured in a direction perpendicular to the thickness and excluding any coating on the flake, of at least 1 µm, in some examples a diameter of at least 2 µm, in some examples a diameter of at least 3 µm, in some examples a diameter of at least 4 µm, in some examples a diameter of at least 5 µm, in some examples a diameter of at least 6 µm, in some examples a diameter of at least 7 µm, in some examples a diameter of at least 8 µm. In some examples, the flake has a diameter, measured in a direction perpendicular to the thickness, of 50 µm or less, in some examples a diameter of 40 µm or less, in some examples a diameter of 30 µm or less, in some examples a diameter of 20 µm or less, in some examples a diameter of 15 µm or less.

In some examples, the conductive metallic pigment, excluding any coating thereon, has an aspect ratio of a diameter (measured in a direction perpendicular to the thickness) to its thickness of n:1, where n is at least 2, in some examples at least 5, in some examples at least 10, in some examples at least 20, in some examples at least 30, in some examples at least 35. In some examples, the conductive metallic pigment has an aspect ratio of a diameter (measured in a direction perpendicular to the thickness) to its thickness of n:1, where n is 100 or less, in some examples n is 80 or less, in some examples n is 70 or less, in some examples n is 60 or less, in some examples n is 50 or less.

The conductive metallic pigment may be present in the method and/or electrostatic ink composition in an amount of from 10 wt % to 80 wt % of the total amount of resin and conductive metallic pigment, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and conductive metallic pigment.

The effecting precipitation may involve any method that reduces the solubility of the resin in the first liquid and/or raises the concentration of the resin in the first liquid above the saturation point of the resin, to an extent that precipitation of the resin occurs. In some examples, the temperature of the first liquid is lowered or raised as appropriate to lower the solubility of the resin in the first liquid to an extent that precipitation occurs. In other examples, at least some of the first liquid is removed, for example by evaporation, to raise the concentration of the resin in the first liquid to an extent that precipitation of the resin from the first liquid.

In some examples, the effecting precipitation involves contacting a second liquid carrier with the first liquid carrier. In some examples, the resin has a lower solubility in the second liquid carrier than the first liquid carrier. In some examples, the second liquid carrier is added to the first liquid carrier. In some examples, the first liquid carrier is added to the second liquid carrier. In some examples, after effecting precipitation of the resin from the first liquid, the first liquid is removed, to leave the conductive metallic pigment particles having a coating of the resin thereon dispersed in the second liquid. The first liquid may be removed from the second liquid by evaporation or distillation.

In some examples, to create the first liquid carrier containing a dissolved resin and suspended conductive metallic pigment particles, the resin and first liquid carrier may be mixed until the resin has dissolved in the first liquid carrier. In some examples, the resin and first liquid carrier may be heated, e.g. to a temperature of at least 40° C., in some examples to a temperature of at least 50° C., in some examples a temperature of from about 50° C. to 100° C. In some examples, the metallic pigment particles are added to the first liquid carrier after the resin has been dissolved in the first liquid carrier. In other examples, the metallic pigment particles may be added to the first liquid carrier before the resin is dissolved. After the conductive metallic pigment particles have been added to the first liquid carrier, which may already contain dissolved the resin, the first liquid carrier may be subjected to high shear. The high shear process may involve stirring the mixture, for example at a high speed, for example a speed of at least 1000 RPM, in some examples at least 5000 RPM, in some examples at least 5000 RPM, in some examples at least 10,000 RPM, in some examples at least 15,000 RPM, in some examples at least 20,000. The stirring may be carried out for a period of at least 30 seconds, in some examples at least 1 minute in some examples at least 2 minutes. In some examples, the stirring may be carried out at least 10,000 RPM for at least 2 minutes, in some examples at least 20,000 RPM for at least 2 minutes.

In some examples, during and/or after contacting the second liquid carrier with the first liquid carrier, the first and/or second liquid carrier are subjected to high shear mixing. High shear mixing may involve, for example, agitation of the mixture. The high shear process may involve stirring the mixture, for example at a high speed, for example a speed of at least 1000 RPM, in some examples at least 5000 RPM, in some examples at least 5000 RPM, in some examples at least 10,000 RPM, in some examples at least 15,000 RPM, in some examples at least 20,000. The stirring may be carried out for a period of at least 30 seconds, in some examples at least 1 minute in some examples at least 2 minutes. In some examples, the stirring may be carried out at least 10,000 RPM for at least 2 minutes, in some examples at least 20,000 RPM for at least 2 minutes.

In some examples, the first liquid carrier has a dielectric constant of at least 5. In some examples, the second liquid carrier has a dielectric constant of less than 5. In some examples, the first liquid carrier has a dielectric constant of at least 5 and the second liquid carrier has a dielectric constant of less than 5. In some examples, the first liquid carrier has a dielectric constant of at least 6, and the second liquid carrier has a dielectric constant of 3 or less, in some examples 2 or less. In some examples, the first liquid carrier has a dielectric constant of from 5 to 70, and the second liquid carrier has a dielectric constant of 5 or less, in some examples 4 or less, in some examples 3 or less. In some examples, the first liquid carrier has a dielectric constant of from 5 to 50, and the second liquid carrier has a dielectric constant of 5 or less, in some examples 4 or less, in some examples 3 or less. In some examples, the first liquid carrier has a dielectric constant of from 5 to 20, and the second liquid carrier has a dielectric constant of 5 or less, in some examples 4 or less, in some examples 3 or less. In some examples, the first liquid carrier has a dielectric constant of from 5 to 15, and the second liquid carrier has a dielectric constant of 5 or less, in some examples 4 or less, in some examples 3 or less. In some examples, the first liquid carrier has a dielectric constant of from 5 to 10, and the second liquid carrier has a dielectric constant of 5 or less, in some examples 4 or less, in some examples 3 or less. A dielectric constant may be measured using standard techniques and/or may be a dielectric constant as measured at 20° C. Dielectric constants for liquids can be found in many publications, including, but not limited to, CRC Handbook of Chemistry and Physics, 77$^{th}$ Edition, 1996-1997, Editor: David R. Lide, see part 6, page 151 to 184, which is incorporated herein by reference in its entirety.

In some examples, the first liquid carrier is selected from tetrahydrofuran, an alkyl acetate, acetone, dimethylformamide, acetonitrile and dimethyl sulphoxide. An alkyl acetate may be a $C_{1\ to\ 10}$ acetate, in some examples a $C_{1\ to\ 5}$ acetate. The alkyl in the alkyl acetate may be a branched or straight chain alkyl. In some examples, the alkyl acetate may be selected from methyl acetate, ethyl acetate, propyl acetate, butyl acetate and pentyl acetate. Propyl acetate may be selected from n-propyl acetate and i-propyl acetate. Butyl acetate may be selected from n-butyl acetate, i-butyl acetate and t-butyl acetate.

In some examples, the second liquid carrier is suitable for use as a carrier in a liquid electrostatic printing composition. If an electrostatic ink composition is formed by the method, the second liquid carrier may act as a dispersing medium for the other components in the electrostatic ink composition. In some examples, the second liquid carrier can comprise or be a hydrocarbon, a silicone oil, and a vegetable oil. In some examples, the second liquid carrier can include, but is not limited to, an insulating, non-polar, non-aqueous liquid. In some examples, the liquid carrier can include compounds that have a resistivity in excess of about $10^9$ ohm-cm. The liquid carrier may have a dielectric constant below about 5, and in some examples below about 3.

The second liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the second liquid carriers include, but are not limited to, aliphatic hydrocarbons, isoparaffinic compounds, paraffinic compounds, dearomatized hydrocarbon compounds, and the like. In some examples, the second liquid carrier is or comprises an isoparaffinic compound. In some examples, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™ Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, Nisseki Isosol 300™ Nisseki Isosol 400™ AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

In an example, the second liquid carrier constitutes about 20 to 99.5% by weight of the electrostatic ink composition or composition resulting from the method, which may be an electrostatic ink composition, in some examples 50 to 99.5% by weight of the electrostatic ink composition or composition resulting from the method, which may be an electrostatic ink composition. In another example, the liquid carrier may constitute about 40 to 90% by weight of the electrostatic ink composition or composition resulting from the method, which may be an electrostatic ink composition. In another example, the liquid carrier may constitute about 60 to 80% by weight of electrostatic ink composition or composition resulting from the method, which may be an electrostatic ink composition. In another example, the liquid carrier may constitute about 90 to 99.5% by weight of the electrostatic ink composition or composition resulting from the method, which may be an electrostatic ink composition, in some examples 95 to 99% by weight of the electrostatic ink composition or composition resulting from the method, which may be an electrostatic ink composition, for example as produced in accordance with the first aspect or in accordance with the second aspect.

In some examples, the composition resulting from the precipitation of the resin from the first liquid carrier is suitable for use as or is converted to an electrostatic ink composition. The electrostatic ink composition may be a dry toner or an liquid toner composition. The electrostatic ink composition may comprise chargeable particles comprising the resin and the metallic pigment particles. In some examples, a chargeable particle comprises metallic pigment particles having a coating of the resin thereon. In some examples, the coating of resin on the conductive metallic pigment particles partially or completely encapsulates the conductive metallic pigment particles. In some examples, the electrostatic ink composition may comprise chargeable particles comprising the resin and the metallic pigment particles, wherein at least some of the metallic pigment particles are completely encapsulated by the coating of the resin. A chargeable particle may be a toner particle suitable for use in an electrostatic printing process. A chargeable particle may be capable of undergoing electrophoresis in an electric field. A chargeable particle may have a charge, e.g. of negative or positive polarity, or be capable of developing a charge when placed in an electric field gradient. In some examples, the composition resulting from the precipitation of the resin from the first liquid carrier is suitable for use as or is converted to an electrostatic ink composition by removing the first liquid to leave chargeable particles, comprising the resin and the metallic pigment particles, dispersed in the second liquid. The chargeable particles may be capable of developing a charge from the nature of the resin, e.g. if the resin has acidic side groups. In some examples, an electrostatic ink composition may comprise a charge director. In some examples, a charge director may be present in the first liquid before precipitation of the resin. In some examples, a charge director is added during or after precipitation of the resin. In some examples, a charge director is added to the composition resulting from the precipitation of the resin from the first liquid carrier to convert it to an electrostatic ink composition. In some examples, the first liquid may be removed to form an electrostatic ink composition comprising (i) chargeable particles comprises metallic pigment particles having a coating of the resin thereon, the chargeable particles dispersed in the second liquid, and, in some examples, (ii) a charge director. In some examples, the first liquid may be removed to form a composition comprising chargeable particle comprises metallic pigment particles having a coating of the resin thereon, the chargeable particles dispersed in the second liquid, and a charge director then added to the second liquid to form an electrostatic ink composition.

The removal of the first liquid may remove at least 80% by weight of the amount of first liquid present before removal with the second liquid. In some examples, the removal of the first liquid may remove at least 90% by weight, in some examples at least 95% by weight, in some examples at least 98% by weight, in some examples at least 99% by weight, of the amount of first liquid present before removal with the second liquid. The removal of the first liquid from the second liquid may be evaporation. The removal of the first liquid from the second liquid may be by distillation. In some examples, the first liquid has a lower boiling point than the second liquid, to allow selective distillation and removal of at least some of first liquid from the second liquid.

In some examples, the conductive metallic pigments, excluding any coating thereon, constitute 25% or less by weight of the solids in the electrostatic ink composition or composition resulting from the method, which may be an electrostatic ink composition. In some examples, the conductive metallic pigments, excluding any coating thereon, constitute 12% or less by weight, in some examples 10% or less by weight, in some examples 8% or less by weight of the solids in the electrostatic ink composition or composition resulting from the method, which may be an electrostatic ink composition. In some examples, the conductive metallic pigments, excluding any coating thereon, constitute 1% or more by weight, in some examples 2% or more by weight, in some examples 4% or more by weight, in some examples 6% or more by weight by weight, in some examples 8% or more by weight, of the solids in electrostatic ink composition or composition resulting from the method, which may be an electrostatic ink composition.

The resin typically includes a polymer. In some examples, the resin comprises a polymer having acidic side groups. In some examples, the resin comprises a copolymer of an alkylene monomer and a monomer selected from acrylic acid and methacrylic acid. The alkylene monomer may, for example, be selected from ethylene and propylene. The alkylene monomer may constitute from 99 wt % to 75 wt % of the polymer, with the a monomer selected from acrylic acid and methacrylic acid constituting the remaining wt %.

The resin can include, but is not limited to, a thermoplastic polymer. In some examples, the polymer of the resin may be selected from ethylene acrylic acid copolymers; methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is in some examples from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

As described herein, the resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SUR-LYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a copolymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the examples mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers can be selected from the Nucrel family of toners (e.g. Nucrel 403™, Nucrel 407™ Nucrel 609HS™, Nucrel 908HS™, Nucrel 1202HC™, Nucrel 30707™ Nucrel 1214™, Nucrel 903™, Nucrel 399Q™ Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

In an example, the resin constitutes about 5 to 90%, in some examples about 5 to 70%, by weight of any of: (i) the solids of the electrostatic ink composition, (ii) the solids of the first liquid before precipitation of the resin, (iii) the solids of the composition resulting from the method, which may be an electrostatic ink composition. In another example, the resin constitutes about 10 to 60% by weight of any of: (i) the solids of the electrostatic ink composition, (ii) the solids of the first liquid before precipitation of the resin, (iii) the solids of the composition resulting from the method, which may be an electrostatic ink composition. In another example, the resin constitutes about 15 to 40% by weight of any of: (i) the solids of the electrostatic ink composition, (ii) the solids of the first liquid before precipitation of the resin, (iii) the solids of the composition resulting from the method, which may be an electrostatic ink composition. In another example, the resin constitutes about 60 to 95% by weight, in some examples from 70 to 90% by weight, in some examples 75 to 85% by weight, of any of: (i) the solids of the electrostatic ink composition, (ii) the solids of the first liquid before precipitation of the resin, (iii) the solids of the composition resulting from the method, which may be an electrostatic ink composition.

In some examples a surfactant is present in the first liquid carrier before, during and/or after effecting precipitation of the resin from the first liquid. In some examples a surfactant is present in the electrostatic ink composition or the composition resulting from the method, which may be an electrostatic ink composition. A surfactant has been found to promote encapsulation of the conductive metallic pigment particles by the resin, which has been found to promote the print properties of resin-coated metallic pigment particles. Surfactants comprises an acidic group have been found to be particularly effective. Accordingly, in some examples, the surfactant comprises an acidic group. In some examples, the surfactant is or comprises a polyhydroxy fatty acid, which may be a saturated or unsaturated fatty acid. The polyhydroxy fatty acid may be a $C_8$ to $C_{26}$ polyhydroxy fatty acid, in some examples a $C_{12}$ to $C_{20}$ polyhydroxy fatty acid, in some examples a $C_{16}$ to $C_{20}$ polyhydroxy fatty acid. In some examples, the polyhydroxy fatty acid is a polyhydroxystearic acid. In some examples, the polyhydroxy fatty acid is poly(12-hydroxystearic acid) stearate. In some examples, the surfactant is or comprises Solsperse® 3000, available from Lubrizol. The polyhydroxy fatty acid may have a molecular weight of at least 300 Daltons, in some examples at least 1000 Daltons, in some examples 300 to 24000 Daltons, in some examples 1000 to 24000 Daltons.

In some examples, the surfactant may be selected from anionic surfactant, cationic surfactant, amphoteric surfactant, non-ionic surfactant, polymeric surfactant, oligomeric surfactant, crosslinking surfactant, or combinations thereof.

The anionic surfactant may be or comprise sulfosuccinic acid and derivatives thereof such as, for instance, alkyl sulfosuccinates (e.g., GEROPON® SBFA-30 and GEROPON® SSO-75, both of which are manufactured by Rhodia, Boulogne-Billancourt, France) and docusate sodium.

The cationic surfactant may be selected from quaternary amine polymers, protonated amine polymers, and polymers containing aluminum (such as those that are available from Lubrizol Corp., Wickliffe, Ohio). Further examples of cationic surfacants include SOLSPERSE® 2155, 9000, 13650, 13940, and 19000 (Lubrizol Corp.) and other like cationic surfacants.

The amphoteric surfactant may be selected from surfactants that contain compounds having protonizable groups and/or ionizable acid groups. An example of a suitable amphoteric surfactant includes lecithin.

The non-ionic surfactant may be selected from oil-soluble polyesters, polyamines, polyacrylates, polymethacrylates (such as, e.g., SOLSPERSE® 3000 (Lubrizol Corp.), SOLSPERSE® 21000 (Lubrizol Corp.), or the like.

The oligomeric surfactant may be selected from low average molecular weight (i.e, less than 1000) non-ionic surfacants.

The cross-linking surfactant may be selected from polymers or oligomers containing two or more carbon double bonds (C═C) and/or free amine groups such as, e.g., polyamines, crosslinkable polyurethanes, and divinyl benzene.

Other suitable surfacants include OS#13309AP, OS#13309AQ, 14179BL, and 45479AB from Lubrizol Corp, which are surfactants based on polyisobutylene succinic acid with polyethyleneimines. These surfacants are combination polymers that are cationic in nature.

In some examples, the surfactant is selected from a fatty acid sarcosine and a fatty acid sarcosinate. In some examples, the fatty acid in the fatty acid sarcosine and/or fatty acid sarcosinate is selected from a $C_8$ to $C_{26}$ fatty acid, in some examples a $C_{12}$ to $C_{20}$ fatty acid, in some examples a $C_{16}$ to $C_{20}$ fatty acid. The fatty acid may be saturated or unsaturated. In some examples, the fatty acid in the fatty acid sarcosine and/or fatty acid sarcosinate is selected from lauroyl, cocoyl, myristoyl, oleoyl, and stearoyl. Suitable surfactants may be available from Crodasinic®, for example Crodasinic L, C, M, O, S or SM.

Surfactants typically comprise a head group and a tail group, with the head group and tail group typically of different polarity, e.g. the head group being polar and the tail group being relatively non-polar compared to the head group. The surfactant may comprise an acidic head group, e.g. a head group comprising a carboxylic acid. The surfactant may comprise a basic head group. The basic head group may comprise an amine group, which may be selected from a primary amine group and a secondary amine group. The basic head group may comprise a plurality of amine groups, which may each independently be selected from a primary amine group and a secondary amine group.

In some examples, the surfactant comprises a succinimide. The succinimide may be linked, e.g. via a hydrocarbon-containing linker group, to an amine group. In some examples, the surfactant comprises a polyisobutylene succinimide having a head group comprising an amine.

In some examples, the surfactant is of formula (I)

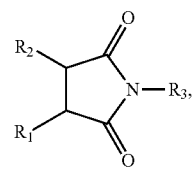

formula (I)

formula (I)
wherein $R_1$, $R_2$ and $R_3$ are selected from an amine-containing head group, a hydrocarbon tail group and hydrogen,
wherein at least one of $R_1$, $R_2$ and $R_3$ comprises a hydrocarbon tail group, at least one of $R_1$, $R_2$ and $R_3$ comprises an amine-containing head group. In some examples, $R_1$ and $R_2$ are selected from a hydrocarbon tail group and hydrogen, with at least one of $R_1$ and $R_2$ comprising a hydrocarbon tail group, and $R_3$ comprises an amine-containing head group. The hydrocarbon tail group may comprise or be a hydrocarbon group, which may be branched or straight chain and may be unsubstituted. The hydrocarbon tail group may comprise or be a hydrocarbon group containing a polyalkylene, which may be selected from a polyethylene, polypropylene, polybutylene. In some examples, the hydrocarbon tail group may contain a polyisobutylene. The hydrocarbon tail group may contain from 10 to 100 carbons, in some examples from 10 to 50 carbons, in some examples from 10 to 30 carbons. The hydrocarbon tail group may be of the formula (II)

P-L- formula (II), wherein P is or comprises polyisobutylene and L is selected from a single bond, $(CH_2)_n$, wherein n is from 0 to 5, in some examples 1 to 5, —O— and —NH—. In some examples, the amine-containing head group comprises or is a hydrocarbon group having an amine group attached to one of the carbons of the hydrocarbon group. In some examples, the amine-containing head group is of the formula (III)

$(CH_2)_m[(CH_2)_oNH(CH_2)_p]_q(CH_2)_r$—$NH_2$ formula (III), wherein m is at least 1, in some examples 1 to 5, q is 0 to 10, o is 0, 1 or 2, p is 1 or 2, r is 0 to 10; in some examples, m is 1, o is 1, p is 1 and q is from 0 to 10, in some examples from 1 to 5, and in some examples r is 1 to 5; in some examples m is 1, q is 0 to 10, in some examples 1 to 10, in some examples 1 to 5, o is 1, p is 1, r is 1.

In some examples, the surfactant is of formula (I), wherein $R_1$ is of formula (II), $R_2$ is H and $R_3$ is of formula (III). In some examples, the surfactant is of formula (I), wherein $R_1$ is of formula (II), wherein L is —$CH_2$—, $R_2$ is H and $R_3$ is of formula (III), wherein m is 1, q is 0 to 10, in some examples 1 to 10, in some examples 1 to 5, o is 1, p is 1 and r is 1. In some examples, the surfactant is or comprises Lubrizol® 6406.

The present disclosure further relates to conductive metallic pigment particles having a coating of resin thereon producible in accordance with a method described herein.

The present disclosure further relates to an electrostatic ink composition comprising conductive metallic pigment particles producible in accordance with a method described herein.

In some examples, the composition resulting from the precipitation of the resin from the first liquid carrier is suitable for use as or is converted to an electrostatic ink composition.

The electrostatic ink composition and/or the composition resulting from the method, which may be an electrostatic ink composition, may comprises an additive or a plurality of additives. The additive or plurality of additives may be added at any stage of the method. The additive or plurality of additives may be selected from a charge director, a charge adjuvant, a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refers to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

The electrostatic ink composition or the composition resulting from the method, which may be an electrostatic ink composition, may include a charge director. The method as described here may involve adding a charge director at any stage. The charge director may be added to impart a charge of positive or negative polarity on the resin-coated conductive metallic pigment particles and/or maintain sufficient electrostatic charge on the resin-coated conductive metallic pigment particles. In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™ and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the resin. In some examples, the charge director imparts a positive charge on the resin-coated conductive metallic pigment particles.

In some examples, the charge director comprises a sulfosuccinate moiety of the general formula [$R_1$—O—C(O)$CH_2CH(SO_3^-)OC(O)$—O—$R_{2'}$], where each of $R_{1'}$ and $R_{2'}$ is an alkyl group. In some examples, the charge director comprises nanoparticles of a simple salt and a sulfosuccinate salt of the general formula $MA_n$, wherein M is a metal, n is the valence of M, and A is an ion of the general formula [$R_1$—O—C(O)$CH_2CH(SO_3^-)OC(O)$—O—$R_{2'}$], where each of $R_{1'}$ and $R_{2'}$ is an alkyl group, or other charge directors as found in WO2007130069, which is incorporated herein by reference in its entirety. As described in WO2007130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{+3}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, $Bf^-$, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula [$R_1$—O—C(O)$CH_2CH(SO_3^-)OC(O)$—O—$R_{2'}$], in some examples, each of $R_{1'}$ and $R_{2'}$ is an aliphatic alkyl group. In some examples, each of $R_{1'}$ and $R_{2'}$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_{1'}$ and $R_{2'}$ are the same. In some examples, at least one of $R_{1'}$ and $R_{2'}$ is $C_{13}H_{27}$. In some examples, M is Na, K, Cs, Ca, or Ba. The formula [$R_1$—O—C(O)$CH_2CH(SO_3^-)OC(O)$—O—$R_{2'}$] and/or the formula $MA_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01 to 20% by weight, in some examples 0.01 to 10% by weight, in some examples 0.01 to 1% by weight of any of: (i) the solids of the electrostatic ink composition, (ii) the solids of the first liquid before precipitation of the resin, (iii) the solids of the composition resulting from the method, which may be an electrostatic ink composition. In some examples, the charge director constitutes about 0.001 to 0.15% by weight of any of: (i) the solids of the electrostatic ink composition, (ii) the solids of the first liquid before precipitation of the resin, (iii) the solids of the composition resulting from the method, which may be an electrostatic ink composition, in some examples 0.001 to 0.15%, in some examples 0.001 to 0.02% by weight of any of: (i) the solids of the electrostatic ink composition, (ii) the solids of the first liquid before precipitation of the resin, (iii) the solids of the composition resulting from the method, which may be an electrostatic ink composition.

The electrostatic ink composition or the composition resulting from the method, which may be an electrostatic ink composition, may include a charge adjuvant. A charge adjuvant may promote charging of the toner particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is aluminum di- or tristearate. The charge adjuvant may be present in an amount of about 0.1 to 5, about 0.5 to 4, and about 1 to 3% weight in any of: (i) the solids of the electrostatic ink composition, (ii) the solids of the first liquid before precipitation of the resin, (iii) the solids of the composition resulting from the method, which may be an electrostatic ink composition.

The present disclosure also relates to a method of electrostatic printing using an electrostatic ink composition as described herein, which may result from the method described herein, the electrostatic ink composition comprising resin-coated conductive metallic pigment particles, the method comprising:
  forming a latent electrostatic image on a surface;
  contacting the surface with the electrostatic ink composition, such that at least some of the particles adhere to the surface to form a developed toner image on the surface, and transferring the toner image to a print substrate, in some examples, via an intermediate transfer member.

The surface on which the latent electrostatic image is formed may be on a rotating member, e.g. in the form of a cylinder. The surface on which the latent electrostatic image is formed may form part of a photo imaging plate (PIP). The intermediate transfer member may be a rotating flexible member, which may be heated, e.g. to a temperature of from 80 to 130° C. The print substrate may be or comprise a cellulosic print substrate such as paper. The cellulosic print substrate may be or comprise an uncoated cellulosic print substrate, i.e. absent of a coating of a polymeric material. The print substrate may be an acrylic print substrate, in some examples a coated acrylic print substrate, e.g. coated with a styrene-butadiene co-polymer.

EXAMPLES

The following illustrates examples of the methods and related aspects described herein. Thus, these examples should not be considered as limitations of the present disclosure, but are merely in place to teach how to make examples of compositions of the present disclosure. As such, a representative number of compositions and their method of manufacture are disclosed herein.

Coating Conductive Pigment Particles

A general procedure for coating conductive pigment particles is described below.

As a first step, a resin was obtained or prepared. In this example, two resins were tested:
1. "AC580" (Honeywell A-C® 580); or
2. "F/ACE", a mixture of 80 wt % "Resin F" (DuPont® Nucrel® 699) and 20 wt % "ACE" (Honeywell® A-C® 5120), mixed in a Ross double planetary mixer. The total amount of Nucrel® 699 and A-C® 5120 resins was 2.1 gr and they were present, respectively, in the weight proportions 80:20.

Next, the selected resin (i.e. 1 or 2 above) was mixed with 60-150 ml of carrier liquid (either Butyl Acetate (BuAc) or Tetrahydrofuran (THF)) until dissolved. Optionally, the carrier liquid was heated until the resin had dissolved. The selected metallic pigment (i.e. aluminium flakes; Schlenk's ON/VP/12541 or ON/VP/12828) 15-80 wt % on Resin were then dispersed in the same carrier liquid using a High Shear Heidolph DIAX100 Homogenizer at 20,000 rpm. In some tests, a dispersant, selected from Lubrizol's Solsperse® 3000, Lubrizol's Lubrizol® 6406 or Croda's CRODASINIC™ 0, was added in an amount of 10% on Pigment weight. The resin solution and the pigment dispersion were mixed using Heidolph DIAX100.

This product was then mixed with 150 ml/114 g of an anti-solvent (a solvent in which the resin cannot be dissolved), namely Isopar-L, available from ExxonMobil, in High Shear T25 ULTRA TURRAX® Homogenizer under the following conditions 50-70 C, 3400-24,000 rpm. Finally, a vacuum was applied to evaporate the solvent (i.e. BuAc or THF), leaving the resin-coated pigment in the anti-solvent.

Finally, a charge director was added. This was a natural charge director having the components: (i) natural soya lecithin, (ii) basic barium petronate, and (iii) dodecyl benzene sulphonic acid, with the components (i), (ii) and (iii) being present in the weight ratios of 6.6%:9.8:3.6%. The charge director was added in an amount of from 0.1-10 wt % on ink solids.

A number of examples manufactured using the above general procedure are shown in Table I. The following tests were performed on each in order to characterize the ink before printing in press:
Particle Size (PS) in Malvern Masterizer 2000 (Laser diffraction);
Particle Charge PC (Level and Spikes), Low Field Conductivity (LF), High Field Conductivity (HF) and DC (Direct Current Conductivity);
Low field conductivity is the electrical conductivity of ElectroInk measured at the following conditions:
Electrical field amplitude: 5-15 V/mm
Frequency: 5-15 Hz
Temperature: 23+/−2 C
High field conductivity is the maximum electrical conductivity of ElectroInk measured at the following conditions:
Electrical field pulse:
Shape: Rectangular
Height: 1500 V/mm $$OD = -\text{Log}\left(\frac{\text{Reflected Light}}{\text{Incident Light}}\right)$$

Flop Index is a measure of the change in reflectance of a metallic color as it is rotated through the range of viewing angles. There are several flop index equations, but most are based on the difference between the reflectance near specular and the reflectance far from specular, all divided by the reflectance at an intermediate angle.

In the present inventors' x-rite measuring device, the following equation is used for calculating flop index:

$$\text{Flop Index} = \frac{2.69(L^*_{15°} - L^*_{110°})^{1.11}}{(L^*_{45°})^{0.86}}$$

In the table below, 'PL' indicates Pigment loading, i.e. the weight percent of the conductive metallic pigments in the solids content of the composition.

TABLE I

| Example | % PL | Solvent | Resin Type | Dispersant in Pigment Dispersion | PS [μm] | FI (0.1 DMA) | OD (0.1 DMA) | SEM | LF | HF | DC | PC | Remarks | Q/M no NCD* |
|---|---|---|---|---|---|---|---|---|---|---|---|---|---|---|
| 1J | 20 | BuAc | AC580 | no | 11 | 11 | 0.52 | yes | 88 | 322 | 20.5 | 233.6 | | |
| 2J | 20 | BuAc | AC580 | no | 13.1 | 6.18 | 0.36 | yes | 72 | 303 | 15 | 231 | | |
| 3J | 20 | BuAc | AC580 | no | 12.1 | 6.7 | 0.41 | yes | 112 | 443 | 21.9 | 331 | | |
| 4J (1-12) | 25 | BuAc | AC580 | no | 9.39 | 6.8 | 0.44 | yes | 75 | 331 | 20.5 | 256.2 | 4J(1-12) WD first print | |
| 5J | 15 | BuAc | AC580 | no | 9.58 | 4.85 | 0.4 | yes | 50 | 468 | 19.5 | 418 | | no/yes |
| 6J | 25 | BuAc | F/ACE | no | 13.12 | 6.2 | 0.38 | yes | 58 | spikes | spikes | spikes | | |
| 7J | 25 | BuAc | F/ACE | SP3000 | 19.453 | 3.36 | 0.24 | yes | 48 | spikes | spikes | spikes | | |
| 8J | 25 | BuAc | F/ACE | L6406 | 17.712 | 3.1 | 0.24 | yes | 75 | spikes | spikes | spikes | | |
| 9J | 25 | THF | F/ACE | no | 20 | 3 | 0.27 | yes | 47 | 193 | 24 | 145.5 | | no/yes |
| 10J | 25 | THF | F/ACE | L6406 | 12.3 | 2.8 | 0.25 | yes | 40 | spikes | spikes | spikes | | |
| 12J | 25 | THF | F/ACE | SP3000 | 11 | 5.1 | 0.36 | yes | 52 | 76 | 30.2 | 23.5 | | no/yes |
| 13J | | THF | F/ACE | crodasinic | 12.7 | 5.6 | 0.4 | yes | 78 | 329 | 94 | 251.4 | | no/yes |
| 14J | | THF | F/ACE | crodasinic | 12.4 | 5.2 | 0.42 | yes | 67 | spikes | spikes | spikes | | no/yes |
| 15J(1) | 25 | THF | F/ACE | SP3000 | 11.7 | 3.8 | 0.34 | yes | 50 | 224 | 32.1 | 174 | 15J (1-7) WD PRINT | no/yes |
| 15J(2) | | THF | F/ACE | SP3000 | 11.5 | | | | | | | | | |
| 15J (3-7) | | THF | F/ACE | SP3000 | 11.5 | | | | | | | | | |

*no/yes means development on one electrode only

Duration: 8 sec
Rise time: 1 ms or less
Ripple: 10 V/mm or less
Sampling frequency: 1000 per second
Temperature: 23+/−2 C DC(direct current) conductivity is the average conductivity measured between 6.4 and 7.2 seconds.

Particle conductivity is the difference between the High field conductivity and the low field conductivity.

Q/M with no charge director—the present inventors aimed for development on one electrode only;

The optical density (OD) is measured on the ink printed on paper and is a characteristic of the color strength of the ink. It is measured by spectrometer at an angel of 45 degrees. Optical Density (OD) is given by the equation It seems that the process of microencapsulation by organic phase separation does not damage the shape of the pigment and does not fracture it. This can be learnt from both particle size measurements (the encapsulated pigment has slightly higher PS than the pigment) and from SEM imaging which does not show any bending or small size particles. Furthermore, SEM analysis seemed to show that that the encapsulating resin wets the pigment surface and covers it.

Other indications for the good encapsulation are in Q/M tests: samples were achieved in which the current did not spike and the LF, HF and DC parameters resembled those of process color inks.

Two samples were printed on an HP 6000 printing press. There was a significant difference in ink development ability and squeegee voltage limit between well encapsulated pigment and slightly encapsulated pigment. Slightly encapsulated pigment could not develop ink layer at normal printing voltage, while improvement of the encapsulation enabled that. OD of 2 hits at voltages of—DRV 450V, ELV 1200V was 0.45, flop Index=4.4. Also the squeegee voltage limit was higher for the better encapsulated pigment (up to 150V instead of 70 V).

Microencapsulation by the above method does not deform the metallic (Al) pigment, gives good encapsulation which improve the ability to develop a silver-look ink in LEP.

While the compositions, methods and related aspects have been described with reference to certain examples, those skilled in the art will appreciate that various modifications, changes, omissions, and substitutions can be made without departing from the spirit of the disclosure. It is intended, therefore, that the invention be limited by the scope of the following claims. The features of any dependent claim may be combined with the features of any of the other dependent claims or any and/or any of the independent claims.

The invention claimed is:

1. A method for preparing an electrostatic ink composition that contains conductive metallic pigment particles, the method comprising:
   providing a first liquid carrier containing a dissolved resin and suspended conductive metallic pigment particles;
   effecting precipitation of the resin from the first liquid carrier, such that a coating of the resin is formed on the conductive metallic pigment particles, wherein the effecting precipitation involves contacting a second liquid carrier with the first liquid carrier, the resin having a lower solubility in the second liquid carrier than the first liquid carrier; and
   after effecting precipitation of the resin from the first liquid carrier, removing the first liquid carrier to leave the conductive metallic pigment particles having the coating of the resin thereon dispersed in the second liquid carrier.

2. A method according to claim 1, wherein the composition resulting from the precipitation of the resin from the first liquid carrier is converted to the electrostatic ink composition.

3. A method according to claim 1, wherein, during and/or after contacting the second liquid carrier with the first liquid carrier, the first and/or second liquid carrier are subjected to high shear mixing.

4. A method according to claim 1, wherein the first liquid carrier has a dielectric constant of at least 5 and the second liquid carrier has a dielectric constant of less than 5.

5. A method according to claim 1, wherein the first liquid carrier has a dielectric constant of at least 6 and the second liquid carrier has a dielectric constant of 3 or less.

6. A method according to claim 1, wherein the first liquid carrier is selected from tetrahydrofuran, an alkyl acetate, acetone, dimethylformamide, acetonitrile and dimethyl sulphoxide.

7. A method according to claim 1, wherein the resin comprises a polymer having acidic side groups.

8. A method according to claim 1, wherein the resin comprises a copolymer of an alkylene monomer and a monomer selected from acrylic acid and methacrylic acid.

9. A method according to claim 1, wherein a surfactant is present in the first liquid carrier before, during and/or after effecting precipitation of the resin from the first liquid carrier.

10. A method according to claim 9, wherein the surfactant comprises an acidic group.

11. An electrostatic ink composition, comprising conductive metallic pigment particles producible in accordance with a method comprising:
    providing a first liquid carrier containing a dissolved resin and suspended conductive metallic pigment particles; and
    effecting precipitation of the resin from the first liquid carrier, such that a coating of the resin is formed on the conductive metallic pigment particles;
    wherein the effecting precipitation involves contacting a second liquid carrier with the first liquid carrier, the resin having a lower solubility in the second liquid carrier than the first liquid carrier;
    and wherein, after effecting precipitation of the resin from the first liquid carrier, the first liquid carrier is removed, to leave the conductive metallic pigment particles having the coating of the resin thereon dispersed in the second liquid carrier.

12. A method according to claim 1, further comprising adding an additive selected from the group consisting of a charge director, a charge adjuvant, a wax, a surfactant, biocides, organic solvents, viscosity modifiers, materials for pH adjustment, sequestering agents, preservatives, compatibility additives, and emulsifiers.

13. A method according to claim 1, wherein the second liquid carrier is selected from the group consisting of aliphatic hydrocarbons, isoparaffinic compounds, paraffinic compounds, and dearomatized hydrocarbon compounds.

14. A method according to claim 13, wherein the second liquid carrier is or comprises the isoparaffinic compounds.

15. An electrostatic ink composition according to claim 11, further comprising an additive selected from the group consisting of a charge director, a charge adjuvant, a wax, a surfactant, biocides, organic solvents, viscosity modifiers, materials for pH adjustment, sequestering agents, preservatives, compatibility additives, and emulsifiers.

16. An electrostatic ink composition according to claim 11, wherein the second liquid carrier is selected from the group consisting of aliphatic hydrocarbons, isoparaffinic compounds, paraffinic compounds, and dearomatized hydrocarbon compounds.

17. An electrostatic ink composition according to claim 16, wherein the second liquid carrier is or comprises the isoparaffinic compounds.

* * * * *